June 2, 1959　　　R. B. SITTON　　　2,888,819
SEPTIC TANK AND METHOD OF MANUFACTURE
Filed Feb. 1, 1956　　　　　　　　　2 Sheets-Sheet 2
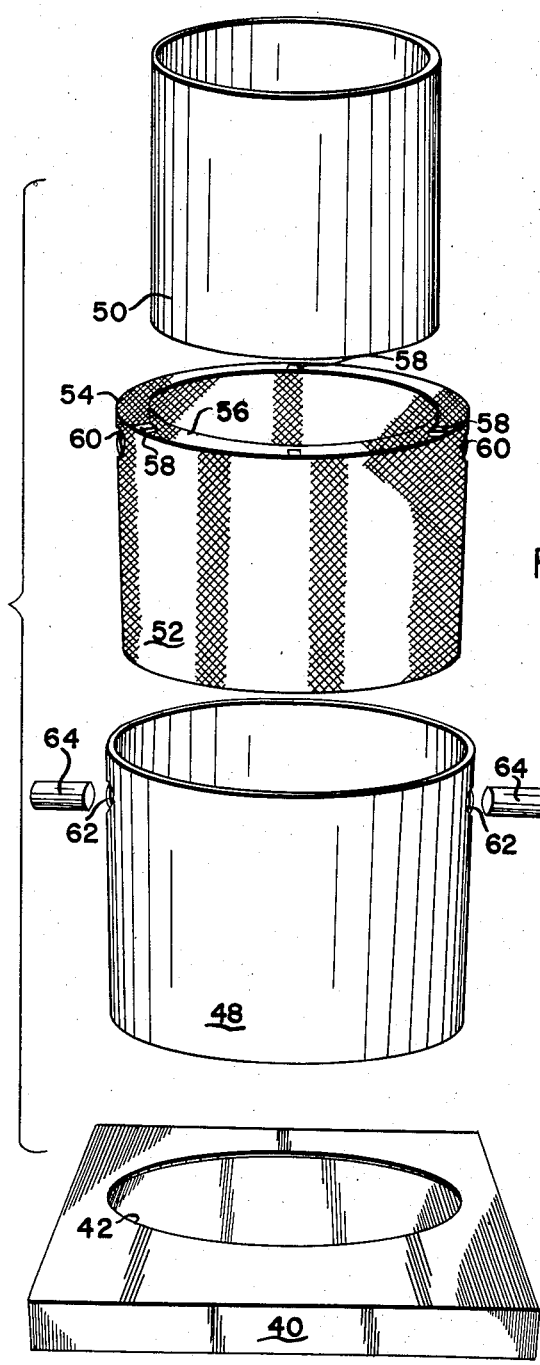
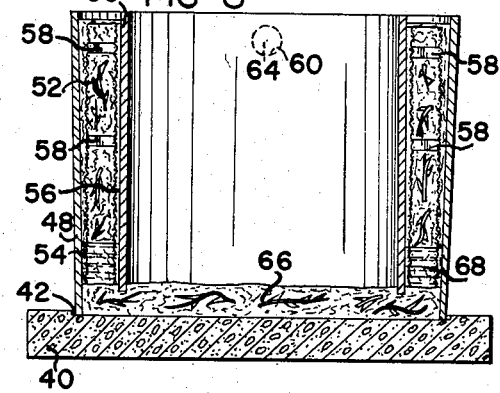
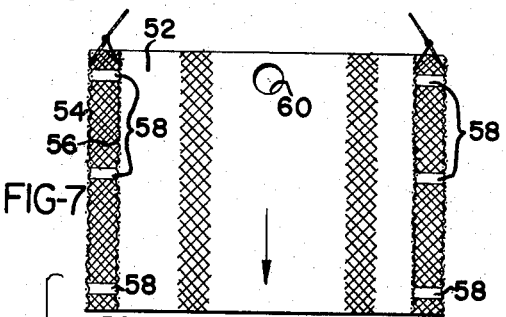
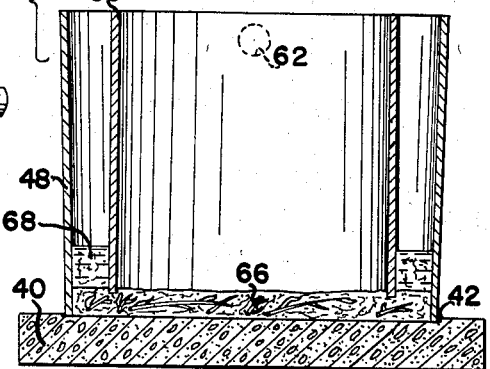
INVENTOR.
RUTH B. SITTON
BY
ATTORNEYS

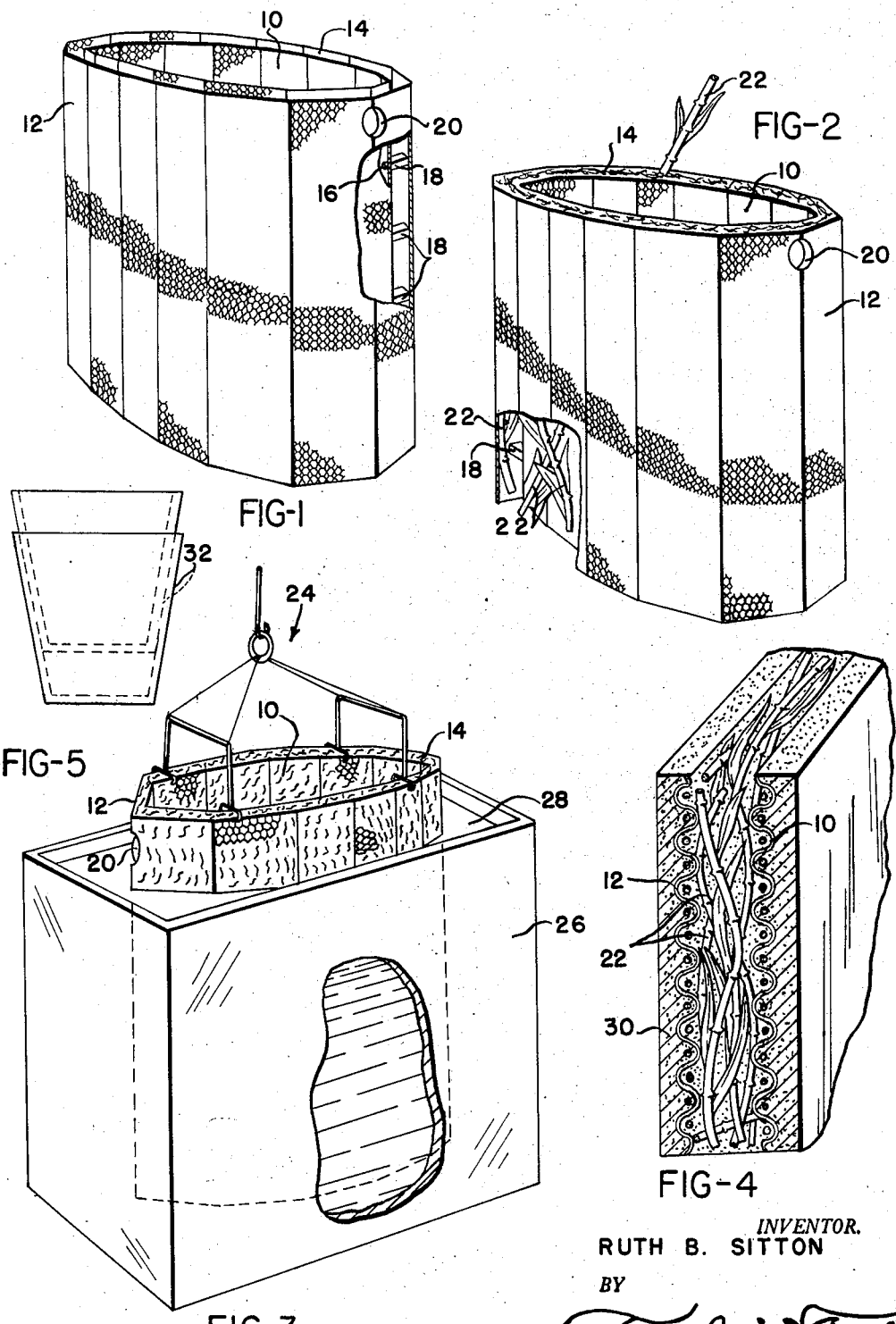

United States Patent Office 2,888,819
Patented June 2, 1959

2,888,819

SEPTIC TANK AND METHOD OF MANUFACTURE

Ruth B. Sitton, Dayton, Ohio

Application February 1, 1956, Serial No. 562,702

8 Claims. (Cl. 72—14)

This invention relates to a septic tank and a method of manufacturing such a tank or a work member similar thereto.

Heretofore septic tanks were generally made of concrete and, in some instances, of steel. Structures of this nature are extremely heavy and have to be made in sections so they can be shipped to the job site where they are assembled in position. This requires special construction, special sealing of the joints, special lifting and carrying devices, and is laborious and time-consuming.

In many instances it is also necessary to manufacture the sections of the tank locally in order to avoid shipping cost, and this type of production does not bring to the customer the advantages of mass production as in a large factory.

The present invention avoids the difficulties referred to above by providing a septic tank construction and a method of manufacturing the tank such that the tank is extremely light and can be made in sections if desired, and can be shipped in knocked-down or assembled condition and, due to the extremely light weight of the tank, no economic disadvantage will obtain from manufacturing it in a central location.

Still another problem that has been encountered with septic tanks is the corrosive action that obtains due to the acids of the contents of the tank which cause continuous erosion and corrosion, not only of concrete, but of steel.

Thus, an object of the present invention is the provision of a septic tank or like work member which is substantially erosion and corrosion-proof, and thus has extremely long life.

A particular object of the present invention is the provision of a septic tank which is extremely light.

Another object of the present invention is the provision of a method of making a septic tank such that the tank is very light.

A further object of the present invention is the provision of a septic tank or like member which is made of relatively inexpensive materials, but which is inherently strong although light and thus can be manufactured by mass production at a central point and economically transported to the point of use.

In brief, the objectives of this invention are obtained by providing a core of lightweight cheap material which is then treated with polyester resin or other types of resins, such as urea phenolic resins, which will provide a strong and stiff structure, but which is extremely light.

According to the present invention the core is formed so as to be inherently self-supporting by providing a lightweight porous, but strong, frame within which the core material is placed. For example, loosely supporting wire, such as chicken wire, foraminous or expanded metal, or even foraminous plastic sheeting or the like, could be employed to form the frame within which the core material is placed.

The frame for the member to be manufactured is first formed, then the lightweight core material is placed therein, and then the entire member is dipped in the resin with which it is to be treated. The resin will coat the core material and seal it off from the material that is placed in the member and from the earth or moisture or whatever other conditions which surround the work member, thereby preventing deterioration of the lightweight bulk material placed within the core.

By repetitively treating the core with the resinous material the resin builds up to give great strength and stiffness to the walls of the member and also to make the walls substantially smooth and impervious whereby the work member, particularly a septic tank or container, can be formed which is light, strong, and which will not deteriorate under acidic conditions that obtain in septic tanks.

The bottom and top of the tank and the baffle elements that are to be placed inwardly of the inlet and outlet openings can be constructed in substantially the same manner, and the joints either assembled in sealing relation with the tank proper at the point of manufacture of the tank, or assembled with the tank at the time of installation thereof.

In any case, a septic tank constructed according to my invention is light, is highly resistant to corrosion and erosion, is easily handled for shipping and installation, and is extremely strong and has long life.

The foregoing objects and advantages of this invention will become more apparent upon reference to the following specification taken in connection with the accompanying drawings, in which:

Figure 1 is a perspective view showing the frame of a core which will form the side wall portion of the septic tank according to the present invention;

Figure 2 is a view similar to Figure 1 but shows the frame of the core being filled with lightweight bulky material such as corn stalks;

Figure 3 shows the step in the operation of making a septic tank according to my invention in which the core frame is filled with the bulky material and is being dipped in a tank of resin;

Figure 4 is a fragmentary perspective sectional view showing how the void spaces in the core are filled with the resinous material and smooth inner and outer wall coatings are built up by the resinous material;

Figure 5 is a diagrammatic view showing the manner in which the tanks constructed according to my invention can be nested for shipping if so desired;

Figure 6 is a perspective view showing the parts of the form and a pre-formed bulk filler for a tank;

Figure 7 is an elevational view showing the manner in which the tank bottom is built up within the form and the form then prepared for receiving a pre-formed bulk filler;

Figure 8 is a sectional view showing the form assembled and the filler in place; and Figure 9 is a fragmentary view showing one manner in which the side wall of the tank could be tied or mechanically interconnected with the base portion thereof.

Referring to the drawings somewhat more in detail, in Figure 1 there is a core frame for a septic tank that is built up of the inner part 10 and the outer part 12 spaced apart as at 14 for receiving a lightweight inexpensive bulky material.

The inner and outer members 10 and 12 may be made of screen wire, inexpensive wire fencing, such as chicken wire, foraminous or expanded metal panels, or any other sort of material which will serve as a carrier for the lightweight bulky material that is to make up the body of the core while at the same time adding strength to the core structure.

For example, open mesh fiber glass cloth could be employed as a carrier for receiving the lightweight core material, but would have the disadvantage of being flexible rather than rigid. On the other hand, metal screen or wire would be a preferred material since it would not only add considerable strength to the core structure, but would be stiff enough to be self-supporting during the manufacturing operations.

It is also conceivable that perforated pressed wood panels, or perforated material, or plywood panels could be employed for making up the core frames if these materials were sufficiently readily available to make the procedure economical, although I prefer, under ordinary circumstances, the wire screen arrangement illustrated.

It will be understood that the inner and outer portions of the core frame could be suitably supported relative to each other, as by being connected together with wire or bolts at 16 with spacing members 18 therebetween.

Also, means are provided for forming inlet and outlet openings in the opposite ends of the tank which may take the form of a cylindrical portion 20 extending between the inner and outer elements of the core frame.

As will be seen in Figure 2, the core frame is then filled with lightweight bulky material which may take the form of the corn stalks 22. Other filling materials from the class of vegetation can be used, such as straw, wood chips, and the like. It is also considered that other bulky lightweight materials, adapted for being received between the inner and outer core members for being retained therein, can be employed for making up the bulk of the body of the core. Cinders, scrap of boxboard, and the like are all possibilities.

After the core frame has been filled with the lightweight bulky material it is then supported by some sort of lifting and carrying device 24 so that it can be dipped into a tank 26 containing resinous material 28. This resinous material will flow through the core frame members into the bulk-filled interior of the core and coat the bulk material within the core frame.

It will be apparent that this resinous material could be supplied to the core by spraying as well as by dipping, and that, preferably, a plurality of coats of the material could be sprayed so as to build a resinous layer of substantial thickness and to fill all voids in the body of the core and provide a smooth surface thereover.

Figure 4 shows a section through a wall constructed according to this invention, wherein the plastic material 30 will be seen completely to fill all the voids within the core frame, and also to fill the interstices of the core frame member themselves and to have been built up to form a substantially smooth inner and outer coating on the frame members.

I prefer to use polyester resins such as polyester-polyamides. Other resin plastics may be used, for example phenolic and vinyl resins. All of these resinous plastics are impervious to moisture and provide protection against the corrosive action of the contents of the tank. I contemplate also employing a cheap material to effect the initial impregnation of the core, and then apply several surface layers of the polyester resin to seal the core.

The curing of the resinous materials can be accomplished by heating the work members, and in order to build up a sufficiently thick deposit of the plastic material it may be preferable to effect repetitive partial curing of the material as it is being applied to the tank, and then, after the wall thickness and solidity thereof has reached the desired degree, to cure the entire tank. Such curing can be done in ovens or by infra-red radiation or, if the nature of the coating material permits, merely by spacing the dips a predetermined time apart.

The tanks, after being constructed in the manner described, may then have bottoms fitted therein which have been constructed in the same manner. These bottoms may be bolted or otherwise fastened into the bottoms of the tanks and are preferably sealed thereto by some suitable substantially inert moisture and corrosion-resistant material, such as a high polymer polyethylene.

Since it is the intention of my invention to provide a septic tank structure and a method of making it such as to enable the tanks to be made more economically at a central plant than they can presently be manufactured by knock-down methods, it becomes important to provide means to reduce the shipping bulk of the individual tanks, and with this in mind I contemplate constructing the tanks as illustrated in Figure 5, wherein the side walls are tapered, as at 32, so that one tank will nest within another and a plurality of tanks can be placed in a little more space than one conventional tank would occupy.

It is also conceivable that tanks can be constructed in sections to be built up into larger tank units; the joints between adjacent sections being sealed by a suitable sealing and binding agent, such as polyethylene, with the same advantages of lightness of construction, ease of manufacture, great strength, and long life.

Another method of constructing a tank according to my invention is illustrated in Figures 6 through 9. In Figure 6 there is shown a platform 40 which may be specially prepared or which may merely comprise any flat smooth surface. This platform 40 may be provided with a recess 42 for receiving a cylindrical or elliptical outer form wall 48. A smaller inner form wall 50 is adapted for being received in outer form wall 48 with a space therebetween of sufficient size to receive a basket-like filler 52 which may be of the same general nature as the structure described in connection with the first modification.

Filler 52 generally comprises an outer screen wall 54 and an inner screen wall 56 supported in spaced relation as by the spacer elements 58, and adapted for receiving between the said walls bulk material such as corn stalks, corn cobs, or other substances consisting essentially of lightweight bulky inexpensive materials.

At diametrically spaced points screen walls 54 may be apertured as at 60, and outer form wall 48 may be apertured as at 62 so that, after the filler has been placed within the form, plugs 64 may be inserted through the apertures to provide openings into and out of the tank.

In making up a tank with the structure described, outer form wall 48 is set on platform 40, or any suitable flat surface, and the bottom wall of the tank is built up therein as indicated at 66, which bottom wall may consist of a combination of bulky material and resin. After this bottom wall has been built up inner form wall 50 is set in place and pressed downwardly into the soft bottom wall in order to provide a seal. Thereafter, a quantity of resin, as at 68, is poured between the walls and the filler unit may then be inserted into the space between the walls, as illustrated in Figure 7. The quantity of resin at 68 is sufficient to completely cover the filler member after it is completely inserted between the form walls, as shown in Figure 8.

After the resinous material has set up sufficiently the inner and outer form walls are pulled from the tank and the tank may be cured by the application of heat.

Optionally, the tank may be cured before the form walls are stripped therefrom, and this can be accomplished readily because the form walls are tapered so that they can readily be stripped from the tank walls.

Also, should it be desired to first insert the filler unit and then pour the resin therein, this can be done although it is believed that a better bond between the side walls and the bottom wall is established where the resin is introduced first.

In some cases it may be desirable to provide a plurality of interconnecting anchor members between the side and bottom walls, as indicated at 70 in Figure 9, thereby securely to lock the side walls to the bottom wall.

Also, the inner form wall can consist of a cup-like member with its own bottom wall, as indicated at 72 in Figure 9, is so desired thereby providing for a smooth upper surface of the bottom wall which would facilitate the subsequent cleaning of the septic tank when this should become necessary.

In either case described in detail above a suitable top could be provided for the tank, with suitable inlet and outlet means to and from the tank according to practices well known in the art.

It will be understood that this invention is susceptible to modification in order to adapt it to different usages and conditions, and accordingly it is desired to comprehend such modifications within this invention as may fall within the scope of the appended claims.

I claim:

1. As a new article of manufacture for use as a septic tank; a wall portion consisting of spaced screen elements and lightweight bulk material therebetween making up a substantial portion of the volume thereof, said bulk material being loosely disposed between the screen elements and being retained in position thereby, and a coating of synthetic resin thereon, said synthetic resin filling the spaces between individual pieces of said bulk material thereby to form a continuous fluid impervious wall.

2. As a new article of manufacture for use as a septic tank; a core frame comprising a relatively open mesh wire or wirelike material approximating the shape of the tank and having spaced inner and outer wall portions, relatively lightweight inexpensive bulk material within said frame loosely filling the space between said inner and outer wall portions and being retained in position thereby, and synthetic material coating said bulk material and frame and filling the spaces therein and therebetween and forming therewith a tank having smooth unbroken walls.

3. As a new article of manufacture for use as a septic tank; a core frame comprising inner and outer wire frames supported in spaced relation, relatively lightweight inexpensive bulk material comprising dried but undecayed vegetable matter loosely filling the space within the frame between said frames and retained in position thereby, and a coating of synthetic resin impregnating and coating said frame and the material therein so as to form a lightweight, inexpensive, fluid-tight tank.

4. A septic tank comprising a wall portion consisting of lightweight inexpensive bulk material, inner and outer open mesh wire frame means containing the bulk material and supporting the bulk material in loose random relation therein, and polyester resin completely filling the wall section and providing continuous unbroken surfaces both inside and outside thereof and also coating the wire frame means.

5. In a method of manufacturing a septic tank; supporting inner and outer open mesh wire frame members in concentric relation to form a core frame, placing inexpensive lightweight bulk material in said core frame, and repetitively dipping the core frame and the bulk material contained therein in a resinous bath until the bulk material and core frame are completely covered with the resinous material and the core frame has continuous fluid-tight walls both inside and outside.

6. A method of making a septic tank which comprises; placing an outer mold wall on a supporting surface, building on said surface the bottom of the tank by coating lightweight inexpensive bulk material with resin to form a solid fluid-tight member, placing an inner wall for the mold inside the outer wall and supporting it on said bottom, placing between said inner and outer walls a prefabricated bulk liner for the tank walls, filling the voids remaining between the inner and outer walls with resin to form a fluid impervious wall, removing the mold walls, and curing the tank.

7. A method of making a septic tank of the nature referred to which comprises; supporting mold walls for the inside and the outside of the tank in spaced relation, building up a foraminous lightweight bulky liner for placing between said walls, and inserting the liner into the space between said walls and filling the voids between the walls and the liner with resin.

8. A septic tank comprising a bottom wall consisting of lightweight bulk material and resin filling the voids in the said wall and coating the said material, a side wall structure extending upwardly from the marginal portion of said bottom wall and also consisting of lightweight bulk coated with resin and the said resin filling the voids in the side wall structure, and means connecting the side wall structure with the bottom wall consisting of metallic members extending to both the side wall and bottom wall.

References Cited in the file of this patent

UNITED STATES PATENTS

| | | |
|---|---|---|
| 964,080 | Wolf | July 12, 1910 |
| 1,406,160 | Klug | Feb. 7, 1922 |
| 1,439,954 | Emerson | Dec. 26, 1922 |
| 1,462,543 | Hanhart | July 24, 1923 |
| 1,585,455 | Wood | May 18, 1926 |
| 1,665,650 | Wood | Apr. 10, 1928 |
| 1,741,760 | Elmendorf | Dec. 31, 1929 |
| 1,767,421 | Wirth | June 24, 1930 |
| 1,924,548 | Gibbons et al. | Aug. 29, 1933 |
| 1,927,567 | Helmers | Sept. 19, 1933 |
| 2,164,499 | Coughlin | July 4, 1939 |
| 2,329,719 | Hewett | Sept. 21, 1943 |
| 2,495,640 | Muskat | Jan. 24, 1950 |
| 2,511,816 | Shaw | June 13, 1950 |
| 2,577,205 | Meyer et al. | Dec. 4, 1951 |
| 2,596,184 | Sutton | May 13, 1952 |
| 2,633,605 | Brucker | Apr. 7, 1953 |
| 2,749,303 | Sitton | June 5, 1956 |

FOREIGN PATENTS

| | | |
|---|---|---|
| 1,015,423 | France | July 23, 1952 |